(12) United States Patent
Jackson

(10) Patent No.: US 7,523,683 B2
(45) Date of Patent: Apr. 28, 2009

(54) SHIFT LEVER MECHANISM

(75) Inventor: Graeme Andrew Jackson, Worsley (GB)

(73) Assignee: Eaton Corporation, Cleveland, OH (US)

( * ) Notice: Subject to any disclaimer, the term of this patent is extended or adjusted under 35 U.S.C. 154(b) by 796 days.

(21) Appl. No.: 10/519,026

(22) PCT Filed: Jul. 3, 2003

(86) PCT No.: PCT/GB03/02850

§ 371 (c)(1),
(2), (4) Date: Dec. 22, 2004

(87) PCT Pub. No.: WO2004/005764

PCT Pub. Date: Jan. 15, 2004

(65) Prior Publication Data

US 2005/0172748 A1    Aug. 11, 2005

(30) Foreign Application Priority Data

Jul. 4, 2002    (GB)    ................. 0215472.2

(51) Int. Cl.
*B60K 20/00* (2006.01)
(52) U.S. Cl. ................. 74/473.34; 74/473.33; 74/473.1
(58) Field of Classification Search ................. 74/473.1, 74/473.12, 473.3, 473.32, 473.33, 473.34
See application file for complete search history.

(56) References Cited

U.S. PATENT DOCUMENTS

| | | | |
|---|---|---|---|
| 3,679,846 A | 7/1972 | Dillon et al. | |
| 4,333,360 A | 6/1982 | Simmons | |
| 4,355,549 A | 10/1982 | Reinhard et al. | |
| 4,519,266 A * | 5/1985 | Reinecke | ................. 74/471 XY |
| 4,561,325 A * | 12/1985 | Jester | ................. 74/745 |
| 4,646,582 A | 3/1987 | Kijima | |
| 4,912,997 A | 4/1990 | Malcolm et al. | |
| 5,189,924 A | 3/1993 | Altenheiner et al. | |

(Continued)

FOREIGN PATENT DOCUMENTS

DE    196 37 533 A1    3/1998

(Continued)

OTHER PUBLICATIONS

UK Search Report dated Jan. 8, 2003 (1 page).

(Continued)

*Primary Examiner*—David M Fenstermacher
(74) *Attorney, Agent, or Firm*—Rader, Fishman & Grauer PLLC

(57) ABSTRACT

A shift lever mechanism (10) comprises a housing (12), having a longitudinal axis (14), and a lever (16), having a first end (18), a second end (20) and a longitudinal axis (22). The mechanism (10) further comprises pivoting means (24) adapted to facilitate pivoting of the lever (16) into predetermined positions. The mechanism (10) further comprises lever position indication means (78) operable to indicate disposal of the lever in one or more positions, and resilient means (92), operable to provide resistance to displacement of the lever (16) into a predetermined restricted position. The pivoting means (24) is attached to the lever (16) and is disposed in a retaining cup (38), being operable to pivot therein. The retaining cup (38) is disposed in the housing (12). The lever position indication means (78) and the resilient means being disposed on the pivoting means (24).

34 Claims, 5 Drawing Sheets

U.S. PATENT DOCUMENTS 5,802,922 A        9/1998   Kawai et al.
6,018,294 A  *     1/2000   Vogel et al. ................. 340/456
6,321,616 B1 *    11/2001   Hohmeier et al. ........ 74/473.28

FOREIGN PATENT DOCUMENTS

| EP | 0 783 081 A1 | 7/1997 |
| EP | 0 877 312 A2 | 11/1998 |
| GB | 1 350 073 | 4/1974 |
| GB | 1 383 752 | 2/1975 |
| GB | 2 084 805 | 4/1982 |
| JP | 53-26026 | 12/1993 |
| WO | WO-99/32316 | 7/1999 |
| WO | WO-00/03162 | 1/2000 |

OTHER PUBLICATIONS

UK Search Report dated Jun. 27, 2003 (2 pages).
International Search Report (5 pages), date unknown.
Derwent English Abstract for DE 196 37 533 A1 (1 page), date unknown.
English language abstract for JP 53 26026.

* cited by examiner

SHIFT LEVER MECHANISM

FIELD OF INVENTION

The present invention relates to gear shift lever mechanisms, particularly to means operable to provide resistance to displacement, and means operable to indicate disposal, of the lever in one or more predetermined positions.

BACKGROUND OF THE INVENTION

Normally, the shifting of ratios in a transmission system is effected by a shift finger acting on a set of transmission forks in the transmission. The shift finger is acted on by a shift lever extending outside the transmission and supported in a supporting mechanism.

Conventionally, on a rear driven vehicle, the shift lever is directly operable on the transmission system and is mounted in a housing extending from the top thereof. On a forward driven vehicle, the shift lever is normally remotely operable on the transmission system by means of a remote control shift assembly. The remote control shift assembly normally comprises a series of levers, or other means such as, for example, cables or hydraulic mechanisms, to which the shift lever is connected.

Known shift lever supporting mechanisms comprise an enlarged spherical portion disposed on the shift lever. The spherical portion is arranged in the mechanism in a retaining cup and is operable, through sphere-to-sphere engagement, to pivot therein to perform shifting operations. The retaining cup is housed in a housing through which the lever extends.

Shift lever mechanisms also generally comprise biasing means operable to provide a biasing force on the lever when it is shifted from a predetermined neutral position.

Known biasing means generally comprise a pair of diametrically opposing return pins operable to contact opposite side surfaces of the lever. The return pins are disposed along an axis transverse to that of the lever in a biased neutral position and are operable to apply a biasing force on the lower regions of the side surfaces of the lever. A gap, due to manufacturing tolerances, normally exists between each side surface and the associated return pin.

In use, pivotal displacement of the lever, from a neutral position, causes it to abut the relevant return pin and, on further displacement of the lever, displaces the return pin against the biasing force of a spring, thereby applying a returning force on the lever operable to encourage the lever back into the neutral position.

Means operable to provide resistance to displacement of the lever into a predetermined position is usually in the form of a biased detent pin, disposed in a transverse direction relative to the return pin, and adapted to provide resistance to displacement thereof. Because the resistance is provided relatively remote from the user, that is, at a distal end of the lever, and through biasing means, the user experiences undesirable distant and non-responsive feel in the shifting action. Further, because of the relative remoteness of the detent from the user a relatively large spherical portion is required to provide sufficient leverage on the return pin to overcome the resistance provided by the detent pin. Furthermore the resistance is only applicable on the lever in a direction in which a return pin is disposed.

Means operable to indicate disposal of the lever in one or more predetermined positions are usually suitably disposed to be actuated by the return pin or the detent pin. Again this is undesirable because of the above mentioned disadvantages.

The abovementioned known mechanisms experience undesirable movement of the lever due to biasing means, in the form of return pins, being disposed only in limited directional positions relative to displacement of the lever. In order to have a completely biased lever it would be necessary to have a return pin disposed in each direction in which the lever is displaceable. This would clearly be uneconomic as each return pin requires a hole machined into the housing in which it is disposed.

Further, the gap between each side surface of the lever and the associated return pin translates into undesirable movement of the lever, which is felt by a user.

Furthermore, the disposition of the return pins, transverse to the longitudinal axis of the housing, and the length of travel required in the pins to provide the desired biasing force, dictates the overall minimum width of the mechanism.

It is desirable for the user to experience a positive feel and positional certainty when the lever is displaced into predetermined positions, including neutral positions.

Further, it is desirable to increase the functional efficiency of shift lever mechanisms and to reduce costs related to manufacturing thereof.

Furthermore, a compact mechanism, the size of which is not dictated by elements thereof extending radially outwards from the longitudinal axis of the housing, is desirable.

SUMMARY OF THE INVENTION

It is an object of the present invention to provide a shift lever mechanism operable to provide the user with positive feel and positional certainty of the lever.

It is also an object of the present invention to provide a shift lever mechanism with increased functional efficiency.

Further, it is an object of the present invention to provide a shift lever mechanism having relatively lower manufacturing costs.

Furthermore, it is an object of the present invention to provide a shift lever mechanism which is compact, the size of which is not dictated by elements thereof extending radially outwards from the longitudinal axis of the housing.

According the present invention there is provided a shift lever mechanism, comprising a lever, pivoting means, adapted to facilitate pivoting of said lever into a plurality of positions, and lever position indication means, operable to indicate disposal of the lever in one or more predetermined positions, wherein the pivoting means comprises a spherical element and the lever position indication means comprises transducer means, disposed adjacent the spherical element to be co-operable with actuation means, such that, upon positioning of the lever in said each predetermined position, the actuation means actuates the transducer means to indicate, to a user, disposal of the lever in said each predetermined position, characterized in that at least part of the actuation means is disposed on the spherical element.

The transducer means may comprise an electrical switch, which may be a potentiometer.

Alternatively, the transducer means may comprise an air valve.

The actuation means advantageously comprises a member and a receiver adapted to receive the member therein. The member may be disposed on the transducer means and the receiver may be disposed on the pivoting means.

The transducer means may be disposed in the housing preferably along an axis extending radially outwards and, more preferably, substantially perpendicular relative to the longitudinal axis of the housing.

Advantageously, at least part of the transducer means, preferably the member, is displaceable relative to at least part of the pivoting means, preferably the receiver. The displacement of the part is preferably along an axis extending radially outwards relative to the pivoting means.

A shift lever according to the present invention may also comprise resilient means, operable to provide resistance to disposal of the lever in one or more predetermined positions, characterized in that the resistance is provided by the pivoting means.

The resilient means may comprise a resilient member and a detent. The detent is preferably disposed on the pivoting means and the member preferably disposed on the housing substantially along an axis extending radially outwards from the pivoting means. The member is preferably displaceable relative to the detent.

The pivoting means may comprise a spherical element advantageously disposed in a retaining cup and operable to pivotally move therein by sphere-to-sphere engagement therewith.

The spherical element may be fixed to the lever thereby forming a pivot point on the lever. The spherical element may be fixed to the lever by means of a retaining pins. Alternatively, the spherical element may form an integral part of the lever.

The lever may extend through the spherical element to form an arrangement substantially coaxial therewith.

The spherical element is preferably disposed on the lever intermediate first and second ends thereof.

The spherical element is preferably formed from a plastics material. Alternatively, the spherical element may be formed from a metallic material.

The retaining cup may be formed from a plastics material. Alternatively, the retaining cup may be formed from a metallic material.

The retaining cup may be disposed in the housing and may be formed from more than one part.

Alternatively, the pivoting means may comprise a plurality of pins attached to each other in such a way as to form a pivotable arrangement.

BRIEF DESCRIPTION OF THE DRAWINGS

The present invention will now be described further, by way of example, with reference to the accompanying drawings, in which.

DETAILED DESCRIPTION OF THE INVENTION

Figure 1:
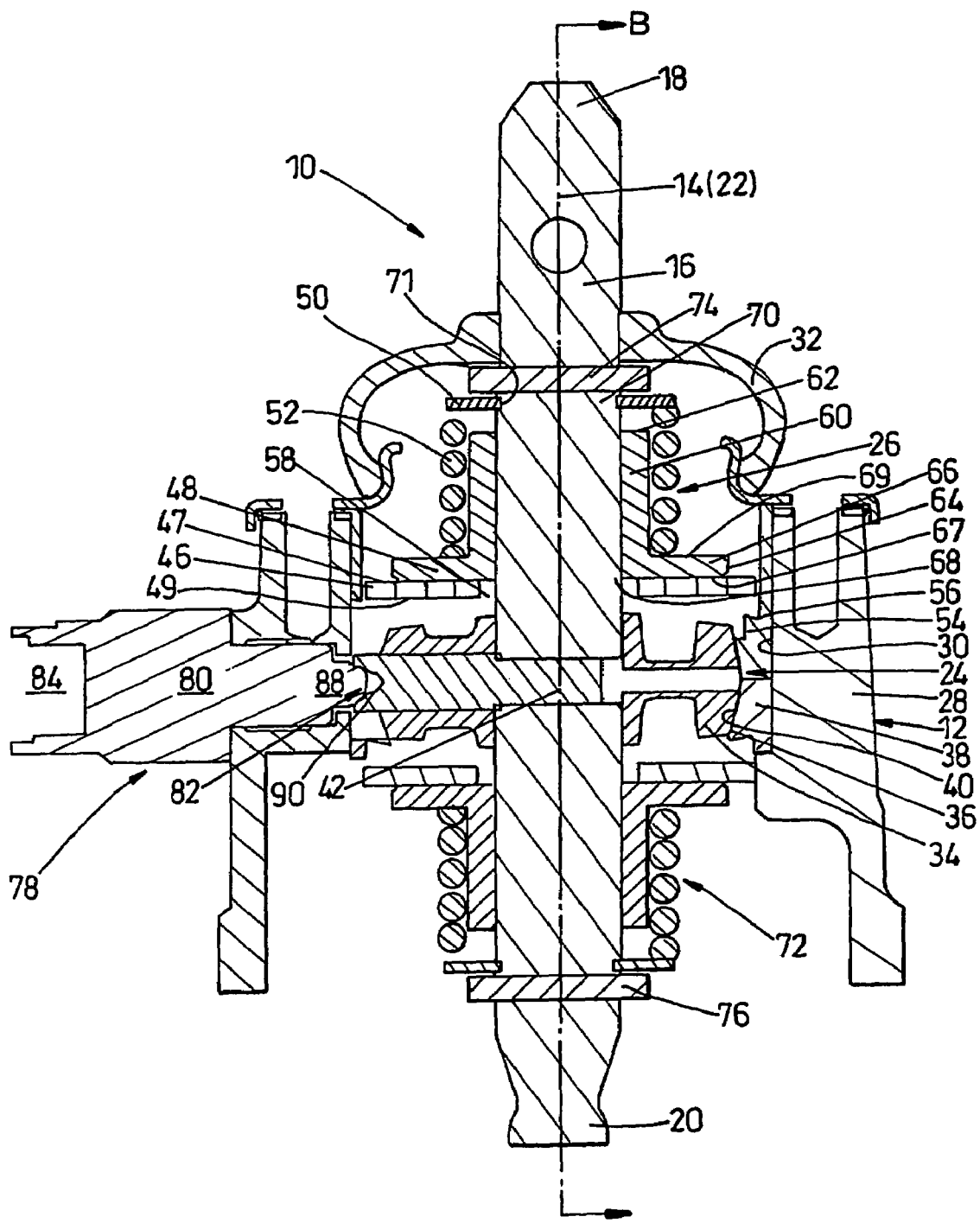
FIG. 1 is a shift lever mechanism according to the present invention, in section through A-A, showing the lever disposed in a biased neutral position.

Referring to the drawings there is shown a shift lever mechanism 10 comprising a housing 12, having a longitudinal axis 14, a lever 16, having a first end 18, a second end 20 and a longitudinal axis 22, pivoting means 24, and biasing means 26.

The housing 12 is cylindrical, formed around the longitudinal axis 14, and comprises a wall 28, having an inner surface 30, and a cover 32.

The lever 16 is formed from an elongate member having an external diameter and, in a neutral position, is disposed within the housing 12 along the longitudinal axis 14 thereof.

The pivoting means 24 comprises a spherical element 34, having an outer spherical surface 36, and a retaining cup 38, having an inner spherical surface 40. The retaining cup 38 is operable to retain the spherical element 34 therein and to provide pivotal displacement of the spherical element 34, about a pivot point 42, by engagement of the outer spherical surface 36 thereof with the inner spherical surface 40 of the retaining cup 38.

The retaining cup 38 may be formed from two or more pieces facilitate assembly of the mechanism.

The spherical element 34 and the retaining cup are formed from a plastics material. Alternatively, they may be formed from a metallic material.

The lever 16 extends through the spherical element 34 and is fixed thereto, intermediate the first and second ends 18 and 20 thereof, by retaining pin 44. The lever 16 is therefore pivotable about the pivot point 42.

The biasing means 26 comprises first and second elements, 46 and 48, adapted to be displaceable along the longitudinal axis 22 of the lever 16, a third element 50 adapted to be fixed relative to the lever 16, and a biasing element in the form of a spring 52 disposed intermediate the second and third elements, 48 and 50, respectively.

The biasing means also comprises stop means 54 in the form of a region of lesser diameter disposed on the inner surface 30 of the housing wall 28 as an abutment 56. The abutment 56 may form part of the retaining cup 38 to reduce manufacturing costs.

The first element 46 is in the form of an annular disk having an external diameter sufficiently small to be displaceable within the housing 12 in the direction of the longitudinal axis 14 thereof, and sufficiently large as to abut the abutment 56 disposed on the inner surface 30 of the housing wall 28. The first element 48 also comprises a bearing face 47 and an axially opposing abutment face 49. The first element 28 also comprises an aperture 58 extending axially there through.

The second element 48 is in the form of a bush, of top hat shape, having a region of lesser external diameter 60 extending to a top end 62 and a region of greater external diameter 64 defining a rimmed end 66. The rimmed end 66 comprises a rimmed end face 67 and a biasing face 69. The second element 48 also comprises an aperture 68 extending axially there through.

The third element 50 is in the form of annular disk having an aperture 70 extending axially there through.

In an assembled state, the lever 16 extends through the aperture 58 of the first element 46. The diameter of the aperture 58 is greater than the external diameter of the lever 16 such that the first element 46 is displaceable in the direction of the longitudinal axis 22 of the lever 16 whilst disposed other than perpendicular to thereto.

The lever 16 further extends through the aperture 68 of the second element 48. The diameter of the aperture 68 is greater than the external diameter of the lever 16, such that the second element 48 is slidable along the longitudinal axis 22 of the lever 16, over the outer surface thereof.

The rimmed end 66 of the second element 48 is disposed such that the rimmed end face 67 abuts the bearing face 47 of the first element 46.

The lever 16 further extends through the aperture 70 of the third element 50. The diameter of the aperture 70 is less than the external diameter of the lever 16. A region of the third element 16 around the aperture 70 extends into the external surface of the lever 16 and is thereby fixed thereto.

The biasing element 52 is disposed to surround the region of lesser diameter 60 of the second element 48 and extend from abutment with the biasing face 69 of the rimmed end 66 to abutment with the third element 50.

The abovementioned pivoting and biasing assembly is retained within the housing by retaining pins 74 and 76 disposed on the lever 16 in the region of the first and second ends 18 and 20 respectively thereof. The lever 16 extends further for user interface beyond the first end 18 and engagement with a transmission system beyond the second end 20.

As shown in the drawings, biasing of the lever 16 may be optimized by second biasing means 72 disposed on the lever to oppose the above mentioned first biasing means 26, that is, such that the pivoting means 24 is disposed on the lever 16 intermediate the first and second biasing means, 26 and 72 respectively, thereby improving the reaction and balance of the lever 16 in response to the biasing forces.

The second biasing means 72 comprises the same components, and the same assembly thereof, as the first biasing means 26.

Figure 2:
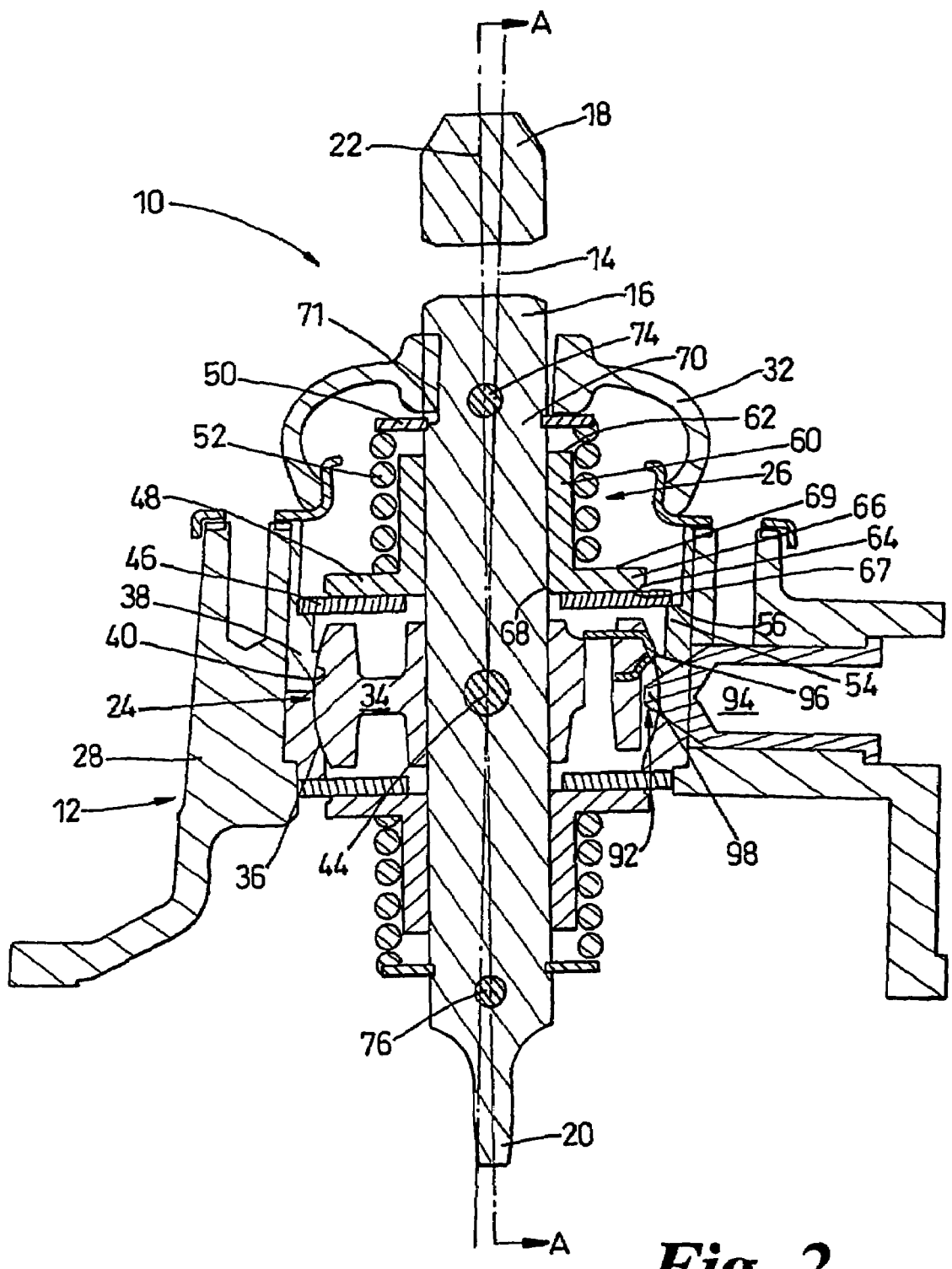
FIG. 2 is the shift lever mechanism of FIG. 1, in section through B-B, showing the lever disposed in a neutral position.

FIGS. 1 and 2 show the lever, in use, in a neutral position, wherein each first element 46 is substantially perpendicular to the longitudinal axis 22 of the lever 16 and each biasing element 52 is, therefore, extended to support and balance the lever 16 in that neutral position.

Figure 3:
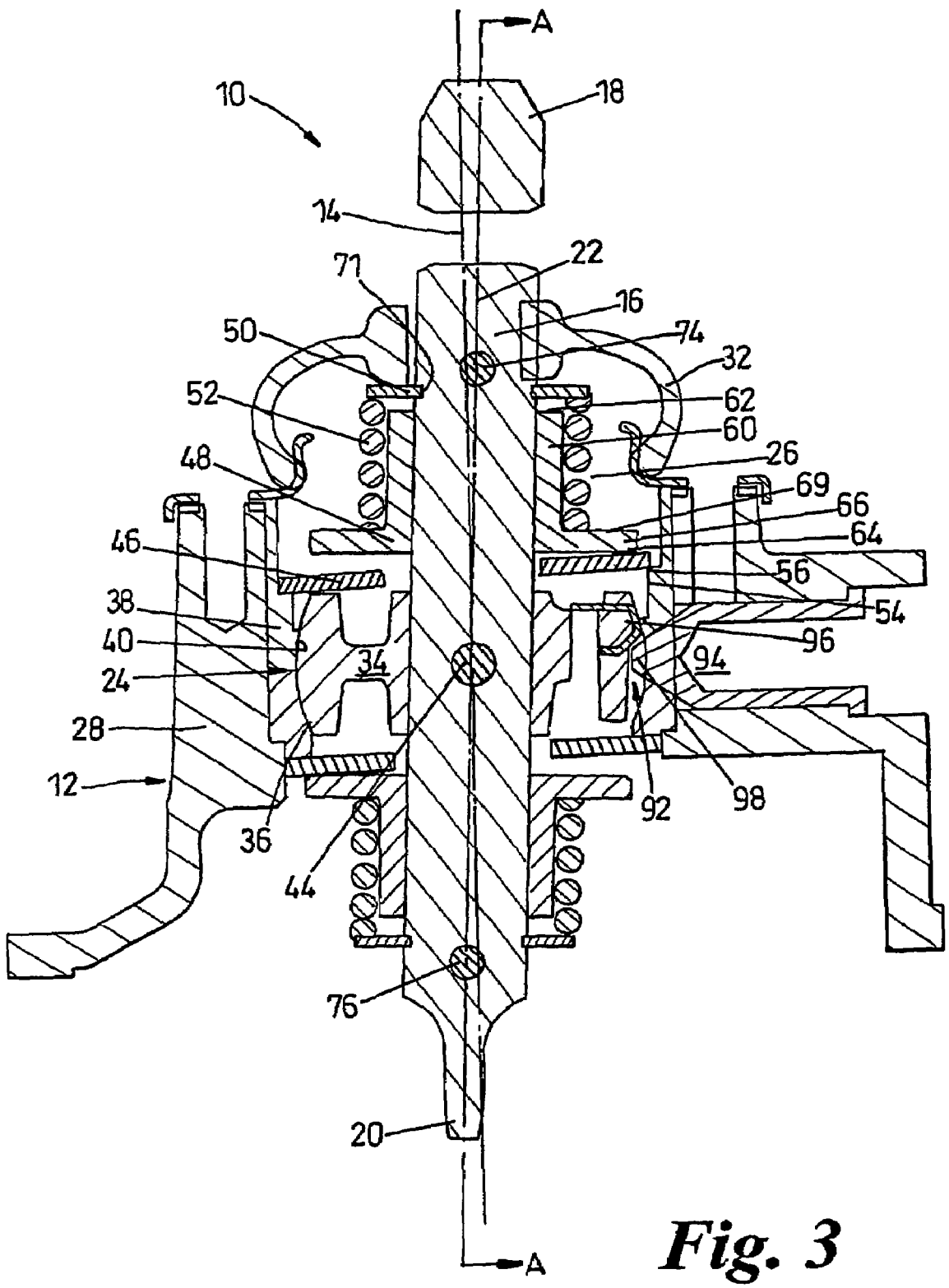
FIG. 3 is the shift lever mechanism of FIGS. 1 and 2, in section through B-B, showing the lever disposed intermediate the neutral position and a predetermined position, engaging resilient means.
Figure 4:
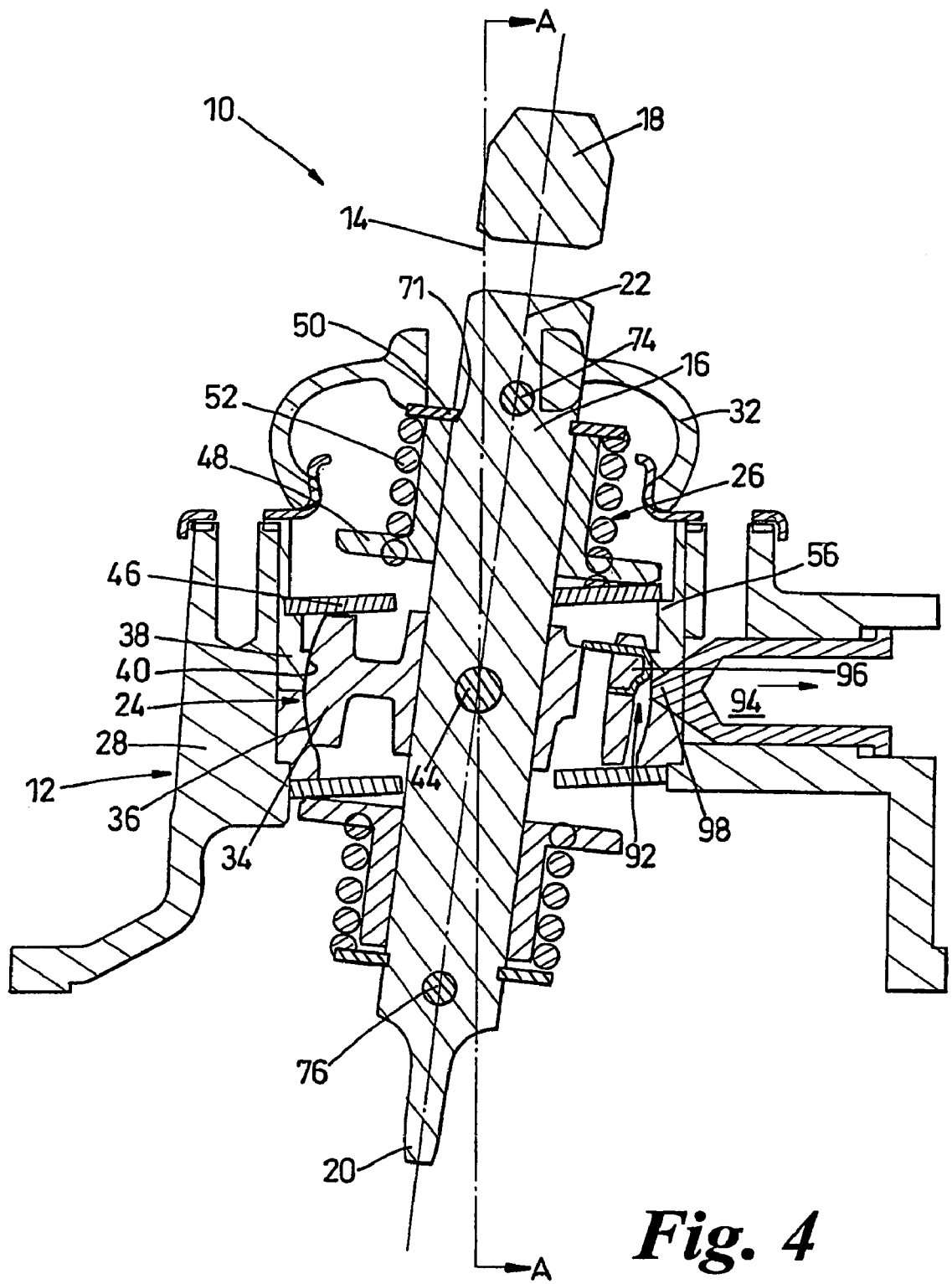
FIG. 4 is the shift lever mechanism of the abovementioned figures, in section through B-B, showing the lever disposed in a predetermined position having overcome the resilient means; and, FIG. 5 is the shift lever mechanism of the abovementioned figures, in section through A-A, showing the lever disposed in a predetermined position.
Figure 5:
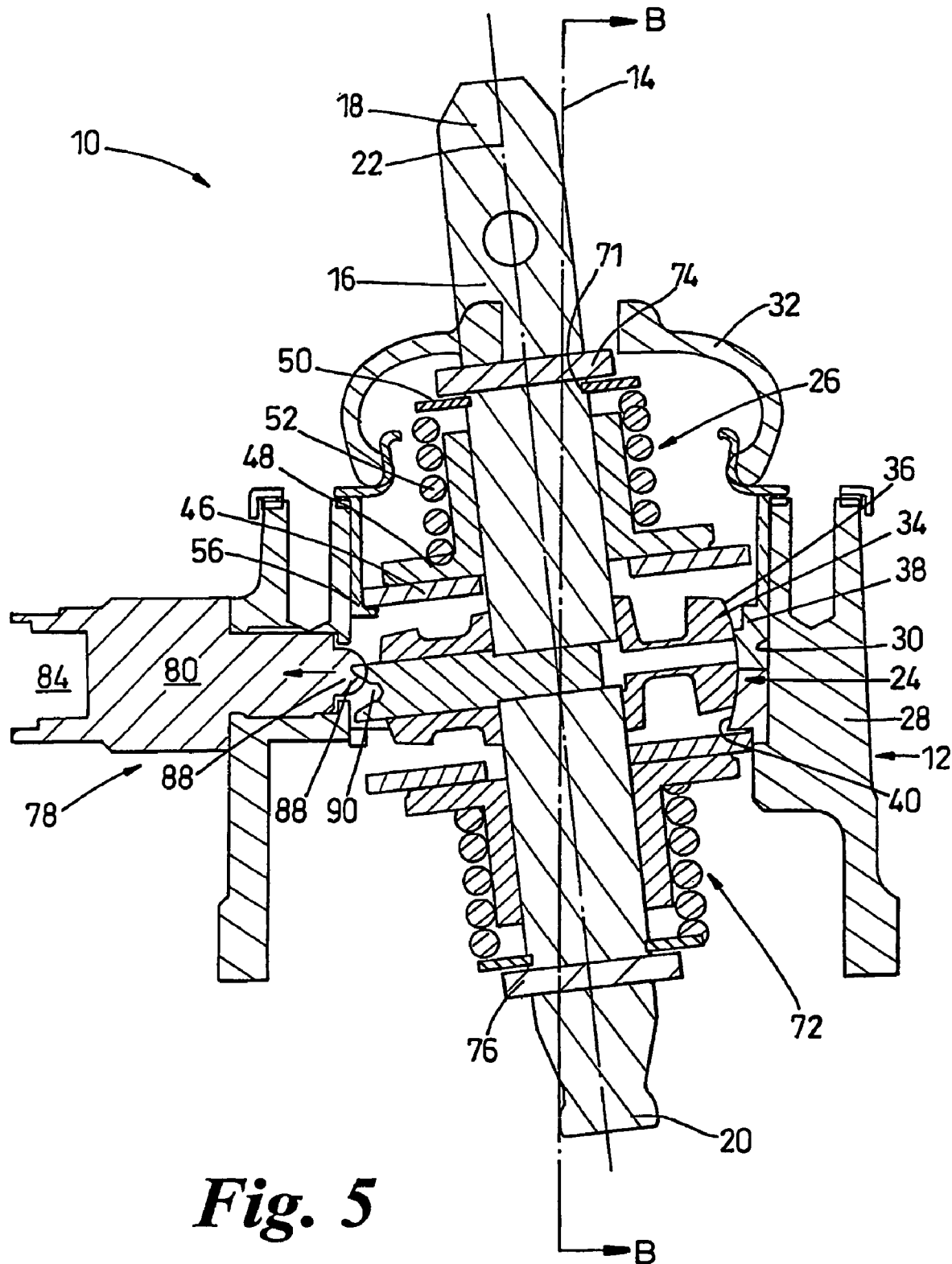

FIGS. 3 and 4 show the lever 16, in use, disposed in a predetermined position, pivoted along a first plane, defined by section line B-B, and FIG. 5 shows the lever 16, in use, disposed in a predetermined position pivoted along a second plane, defined by section line A-A, that is, substantially transverse to that of the first plane.

Referring to FIGS. 3 and 4, the first element 46 is axially fixed relative to the longitudinal axis 14 of the housing 12, to form a bearing platform operable to engage with the second element 48.

In use, the third element 50 is axially fixed relative to the lever 16 and, on pivotal displacement of the lever, applies a force on a region of the biasing element 52 adjacent the direction in which the lever is pivoted. The applied force compresses the biasing element between the third element 50 and the biasing face 69 of the second element 48. The second element 48 is slidable along the lever 16 to allow the lever to pivot. However, the greater the pivotal displacement, the greater the force urging it towards the first element 46, which it is prevented from travelling beyond by engagement therewith.

Therefore, the rimmed end face 67, of the second element, bears onto the bearing face 47, of the first element, to produce a returning biasing force which, through the biasing element 52 and the third element 50, is applied to the lever 16 and thereby biases the lever into the neutral position. The returning biasing force is enhanced by the ability of the second element to slide along the longitudinal axis of the lever.

Simultaneously, as the third element 50 applies a force which compresses the biasing element 52 adjacent the direction in which the lever is pivoted, it also applies a cooperative extending force to the biasing element 52 diametrically opposite the compressing force, which is also operable to bias the lever into the neutral position.

Also simultaneously, the second biasing means is operable in the same manner, as the first biasing means described above, to optimize the reaction and balance the biasing effect on the lever.

Referring to FIGS. 1 and 5, the shift lever mechanism 10 also comprises lever position indication means 78 operable to indicate disposal of the lever 16 in the neutral position.

The lever position indication means 78 comprises a switch 80 operable to engage with switch actuation means 82 to form an electrical signal when the lever 16 is disposed in the neutral position.

The switch 80 comprises a connection end 84 and a contact end 86 and is disposed in the wall 28 of the housing 12 along an axis extending radially outwards from the spherical element 34. The switch 80 is displaceable along the axis in which it is disposed and is biased towards the spherical element 34 such that the contact end 86 is in contact therewith. The connection end 84 is connected to a user interface such as, for example, a visual or audio indicator.

The switch actuation means 82 comprises a member 88 disposed on the contact end 86 of the switch 80 and a member receiver 90 disposed on the spherical element 34. The member 88 is suitably shaped to ride over the surface of the spherical element 34 as the lever 16 is displaced into predetermined positions, as shown in FIG. 5. The member receiver 88 is suitably disposed such that on disposal of the lever 16 in the neutral position the member receiver 90 aligns with the member 88 and receives it therein, as shown in FIG. 1, thereby forming an electrical connection within the switch 80. The electrical connection forms an electrical signal, which actuates the user interface thereby indicating that the lever 16 is in the neutral position.

Referring to FIGS. 2 to 4, the shift lever mechanism 10 also comprises resilient means 92 operable to provide resistance to displacement of the lever 16 into a restricted position such as, for example, a position which shifts the transmission into a reverse gear.

FIGS. 2 to 4 show progressive displacement of the lever 16 into the restricted position.

The resilient means comprises a resilient member 94 and a detent 96.

The resilient member 94 is disposed in the wall 28 of the housing 12 along an axis extending radially outwards from the spherical element 34. The resilient member 94 is displaceable along the axis in which it is disposed and is biased towards the spherical element 34 such that it is in contact therewith The resilient member 94 has a contact end 98 suitably shaped to ride over the surface of the spherical element 34 when the lever 16 is disposed in other positions and to engage with the detent 96 during displacement of the lever 16 into the restricted position.

The detent 96 is suitably disposed on the spherical element 34 to engage with the resilient member 94 only when an attempt is being made to displace the lever 16 into the restricted position.

In use, on an attempt to displace the lever 16 into the restricted position, the resilient member 94 engages the detent 96, which provides resistance to further displacement of the lever 16 in the direction of the restricted position. Increasing the force applied to the lever 16 in the direction of the restricted position, sufficient to overcome the bias applied to the resilient member 94, allows the resilient member 94 to ride over the detent 96, thereby allowing the lever 16 to be disposed in the restricted position.

It will be seen from the description that the present arrangement enables a very compact shift lever assembly to be produced. It can have a reduced height above the transmission when compared to known devices and be smaller because the need for a large spherical pivot element is avoided and the compact biasing means is located on the lever.

Whilst the assembly can work with one biasing means 26, it is preferred to have one above the pivot axis defined by the spherical element 34 and one below it 72. This provides a more balanced feel to the shift operation and facilitated easier design and construction of the assembly.

Throughout the description and claims of this specification the words "comprise" and variations of the word, such as, for example "comprising" and "comprises", mean "including but not limited to", and are not intended to exclude other components or integers.

What is claimed is:

1. A shift lever mechanism comprising:
   a housing including a retaining cup;
   a lever having a longitudinal axis, said lever being at least partially disposed within said housing;
   a pivoting member in operational communication with said lever being adapted to facilitate pivoting of said lever into a plurality positions; and
   a lever position indication member indicating a disposal of said lever in at least one said positions, said lever position indication member being actuated by said pivoting member,
   wherein the pivoting member includes a generally spherical outer surface portion, the retaining cup includes a generally spherical inner surface portion, the inner surface portion guides along at least a portion of the outer surface portion as the lever pivots generally about a pivot center relative to the housing, wherein the lever position indication member selectively contacts a portion of the pivoting member that extends radially outward from the pivot center, and wherein the lever position indication member selectively intersects an axis of rotation of the lever.

2. The shift lever mechanism of claim 1, wherein said lever position indication member includes a transducer member and an actuation member.

3. The shift lever mechanism of claim 1, wherein said transducer member includes a switch.

4. The shift lever mechanism of claim 3, wherein said switch includes a potentiometer.

5. The shift lever mechanism of claim 2, wherein said transducer member includes an air valve.

6. The shift lever mechanism of claim 2, wherein said actuation member includes a contact member, said contact member being in operational communication with a receiver member of said pivoting member.

7. The shift lever mechanism of claim 6, wherein said contact member is disposed on said transducer member and said receiver member is disposed on said pivoting member.

8. The shift lever mechanism of claim 2, wherein said transducer member is disposed on said housing.

9. The shift lever mechanism of claim 2, wherein said transducer member is disposed along an axis extending radially outwards relative to a longitudinal axis of said housing.

10. The shift lever mechanism of claim 9, wherein said transducer member is disposed generally perpendicular relative to said longitudinal axis of said housing.

11. The shift lever mechanism of claim 2, wherein at least part of said transducer member is displaceable relative to at least part of said pivoting member.

12. The shift lever mechanism of claim 6, wherein said contact member is displaceable relative to said receiver member.

13. The shift lever mechanism of claim 6, wherein said contact member is displaceable relative to said receiver member along an axis extending radially outwards relative to said pivoting member.

14. A shift lever mechanism comprising:
    a housing;
    a lever having a longitudinal axis, said lever being at least partially disposed within said housing;
    a pivoting member in operational communication with said lever being adapted to facilitate pivoting of said lever into a plurality positions, wherein the pivoting member includes a generally spherical outer surface portion having a detent formed therein, wherein the detent is defined, at least in part, by a detent surface; and
    a resilient member providing resistance to displacement of said lever in at least one of said positions, wherein the resilient member contacts the detent surface as the resilient member is displaced to provide the resistance.

15. The shift lever mechanism of claim 14, wherein said resilient member includes a detent.

16. The shift lever mechanism of claim 15, wherein said detent is disposed on said pivoting member.

17. The shift lever mechanism of claim 14, wherein said resilient member is disposed on said housing.

18. The shift lever mechanism of claim 14, wherein said resilient member is disposed generally along an axis extending radially outwardly from said pivoting member.

19. The shift lever mechanism of claim 15, wherein said resilient member is displaceable relative to said detent.

20. The shift lever mechanism of claim 14, wherein said pivoting member includes a spherical element.

21. The shift lever mechanism of claim 20, wherein said spherical element is disposed in a retaining cup and is operable to pivotally move therein.

22. The shift lever mechanism of claim 21, wherein at least one of said spherical element and said retaining cup is formed from a plastic material.

23. The shift lever mechanism of claim 21, wherein at least one of said spherical element and said retaining cup is formed from a metallic material.

24. The shift lever mechanism of claim 20, wherein said spherical element is fixed to said lever thereby forming a pivot point on said lever.

25. The shift lever mechanism of claim 20, wherein said spherical element is fixed on said lever by a retaining pin.

26. The shift lever mechanism of claim 20, wherein said spherical element forms an integral part of said lever thereby forming a pivot point on said lever.

27. The shift lever mechanism of claim 20, wherein said lever extends through said spherical element to form an arrangement generally coaxial therewith.

28. A shift lever mechanism comprising:
    a housing having a housing longitudinal axis;
    a lever having a first end and a second end defining a lever longitudinal axis, said lever being at least partially disposed within said housing;
    a pivoting member in operational communication with said lever being adapted to facilitate pivoting of said lever into a plurality predetermined positions; and
    a lever position indication member in selective operational communication with said lever, said lever position indication member indicating a disposal of said lever in at least one of said predetermined positions, said lever position indication member being actuated by a portion of said pivoting member that extends radially from a pivot center of the pivot member, wherein the lever position indication member selectively intersects an axis of rotation of the lever.

29. The shift lever mechanism of claim 28, wherein said pivoting member is attached to said lever.

30. The shift lever mechanism of claim 28, wherein said pivoting member is disposed in a retaining cup.

31. The shift lever mechanism of claim 30, wherein said pivoting member is in operational communication with said retaining cup, the pivoting member including a generally spherical outer surface portion, the retaining cup including a generally spherical inner surface portion, and wherein the inner surface portion guides along at least a portion of the outer surface portion as the lever pivots relative to the housing.

32. The shift lever mechanism of claim 30, wherein said retaining cup is disposed in said housing.

33. The shift lever mechanism of claim 28, wherein a resilient member provides resistance to displacement of said lever in at least one of said predetermined positions.

34. The shift lever mechanism of claim 33, wherein said lever position indication member and said resilient member are disposed on said pivoting member.

* * * * *